Jan. 7, 1936.  K. SCHUBERT  2,027,067
FILTER CIRCUIT
Filed Oct. 24, 1931
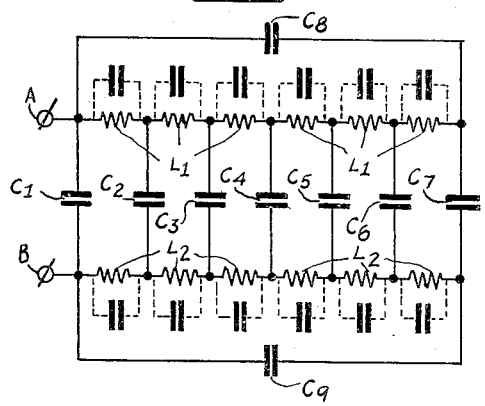
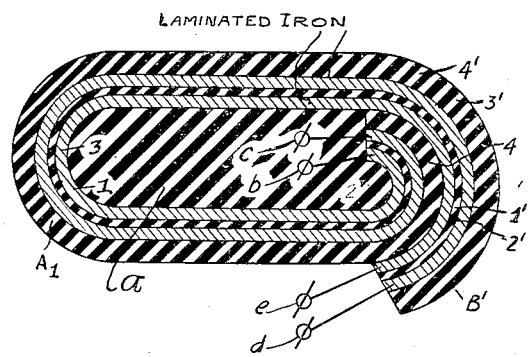
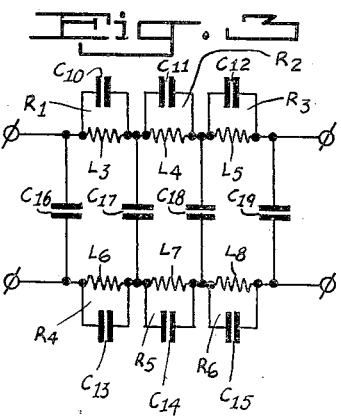
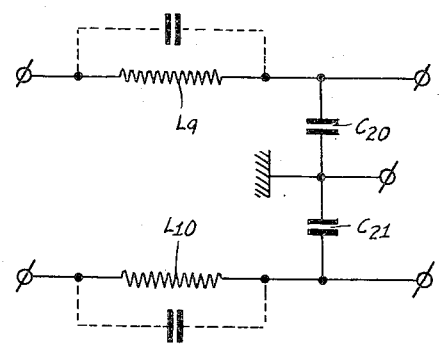
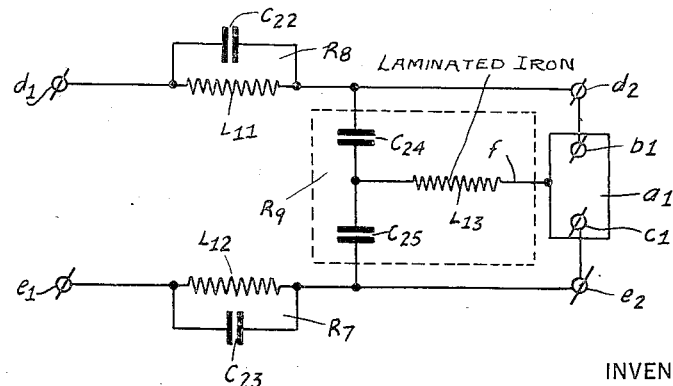
INVENTOR
KURT SCHUBERT
BY
ATTORNEY Patented Jan. 7, 1936

2,027,067

UNITED STATES PATENT OFFICE 2,027,067

FILTER CIRCUIT

Kurt Schubert, Berlin, Germany, assignor to Siemens & Halske, Aktiengesellschaft, Siemensstadt, near Berlin, a corporation of Germany Application October 24, 1931, Serial No. 570,893
In Germany November 5, 1930

9 Claims. (Cl. 178—44)

It is a well known fact that the radio frequency currents arising at the brushes of electric generators and motors and at the electrodes of high frequency therapeutic apparatus and similar devices propagate along the electrical leads thereof. It is also known that the high frequency disturbances spread approximately under co-phasic conditions along the network connections of electrical machines and apparatus.

In order to prevent the propagation of high frequency disturbances along the network connection wires or leads they are provided with filter circuits presenting a high inductive reactance to high frequency currents while their low capacitive reactance provides by-passes or short circuit paths for disturbing high frequency currents.

Filter arrangements of this sort consist mostly of inductance coils included in series with the line wires, while in parallel relation to the terminals of the electric apparatus or machines, capacities are provided.

The inductances in the majority of cases consist of high frequency choke coils of special design in which most attention is given the elimination of harmful inter-turn capacitance. High frequency coils of this kind, therefore, are mostly wound "wild" or without system or the winding is made of the disk or cross type. The manufacture of windings of this kind is very tedious and time consuming, the copper expenditure is greater than in a normal layer winding, and as a result the finished choke coil is comparatively more expensive.

It is also known that two metal foils and two layers of dielectric or similar material may be wound or wrapped about each other in such manner that, looking from the inside, there always alternates a layer of dielectric and a metal foil. Such a wound or roll-type condenser possesses, in addition to the capacity the two metal foils have in reference to each other (which hereinafter shall be briefly called useful capacity), a more or less high inductance according to whether the metal foils comprise a more or less great number of turns. In the roll condensers made in a manner well known in the art, similarly as in the choke coils wound layerwise, inter-turn capacity manifests itself. This capacity inasmuch as it represents the capacity of the constituent turns in relation to one another is in parallel to the inductance due to the turns thus resulting conjointly therewith in a resonance circuit which will be tuned to a definite wave length according to the size of the inductance and the turn capacitance.

Now, the present invention provides an arrangement similar to a roll condenser which may be regarded as a combination of condenser and choke coil, and which is particularly useful as a means adapted to suppress high frequency disturbances.

According to the invention, in addition to the capacity (inter-turn and/or useful capacity) consisting of circuit means comprising one or more tape formed conductors (foils) being wound spool fashion with the interposition of dielectric material between the turns, there is also rendered operative and useful the inductance of the conducting layer or layers for the purpose of suppressing high frequency disturbances by connecting the said conducting layer or layers in series with the network connection wires of an apparatus or a machine causative of high frequency disturbances.

The said circuit means for this purpose is designed in known manner as an ideal artificial line or "transducer", i. e., the beginning and end of each conducting layer being arranged as terminals so that the ends of the foils may be united with the terminals of the machines or apparatus, and the beginnings of the foils with the network terminals.

This situation shall be explained more clearly by reference to the accompanying drawing wherein Fig. 1 represents an equivalent circuit or key diagram of a roll condenser; Fig. 2 represents an embodiment constructed in accordance with this invention; Fig. 3 is a substitute or equivalent circuit diagram for the embodiment of Fig. 2; Figs. 4 and 5 represent other equivalent circuit diagrams of embodiments which may be constructed in a manner similar to Fig. 2.

Referring to Fig. 1, A and B represent the connecting terminals of the condenser. The capacities $C_1$ to $C_7$ inclusive represent the useful capacity, $C_8$ and $C_9$ the turn capacities. $L_1$ and $L_2$ are the inductances produced by the superpositional winding of the metal foils. The impedance of the resonance circuit consisting of the paralleling of capacities $C_8$ and $C_9$ and inductances $L_1$ and $L_2$ is highest for the frequency in the range of which the natural period of the resonance circuit happens to fall.

Fig. 2 is an embodiment in accordance with this invention and represents a winding or wrapper core $a$ being wrapped with a plurality of layers of which two are here illustrated by way of example at $A_1$ and $B_1$. Each of the layers shown consists of two tape shaped conductors (foils) 1 and 3, and of two layers of dielectric 2 and 4. The plies or strata of composite layer A corresponding to numerals 1–4 are designated by 1' to 4' in layer B1. The beginnings of the metal foils 1 and 3 are united with the terminals b and c, the ends of the foils with terminals d and e.

If a circuit means of the kind hereinbefore disclosed is connected, say, at the terminals b and c with the two wires of a network, and if the terminals d and e are associated with the terminals of a machine being the source and seat of a disturbing wave, then there holds good for the same the substitute or equivalent diagram Fig. 3. The capacities C16 to C19 are the useful capacities arising between the layers 1 and 3, and 3 and 1' (Fig. 2). L3–L5 are the inductances of the layer 1 and 1', and L6 to L8 the inductances of layers 3 and 3'. In parallel relation thereto are the inter-turn capacities C10 to C15.

Choosing the dimensions of the conducting layer or layers and the dielectric in such a way that the natural waves of the resonant circuits formed by the paralleling of inter-turn capacities and inductances of the conductive layers come to lie inside the range of the frequencies to be suppressed, then for a device of the kind diagrammatically shown in Fig. 3 there will be insured a maximum amount of action. The resonant circuits R1 to R6, as will be seen, represent for the disturbing frequencies a maximum impedance.

However, if it is desired for some reason or another to make the inter-turn capacity high compared with the inductance, then by choosing suitable proportions for the conductive layers and the dielectric also this effect is insurable by simple ways and means.

If the layers of dielectric 2 and 4 (Fig. 2) were made equally heavy, the effect required to secure suppression of high frequency currents would be unattainable owing to the formation of resonance circuits whose natural frequencies would lie inside the range of the disturbing or stray actions, since then, unless the dielectric is made particularly heavy the inter-turn capacity becomes so high that the natural waves of the resonant circuits come to lie above the range of the high frequency oscillations. Hence, as shown in Fig. 2, the best plan is to choose the dielectric layer provided between the constituent layers (the layer denoted by 4 in Fig. 2) heavier than the one between the conducting layers (layer 2, in Fig. 2). Since, as shown in Fig. 2, the inter-turn capacity between 1 and 1' consists of the useful capacity arising between 1 and 3, and between 3' and 1' it follows that since the useful capacity between 3 and 1' is low in comparison with that between 1 and 3, the inter-turn capacity according to the law governing capacities in series has a value which is lower than the useful capacity between 3 and 1', and since the same by suitable dimensioning of the dielectric layer 4 has for the time being been chosen small, it follows that the inter-turn capacity is extremely low.

The effect attainable by choosing the thickness of one layer of dielectric greater than that of the other may also be secured when there are equal thicknesses of the dielectric layers, by making the layer of dielectric which is interposed between the constituent layers of a material having a lower dielectric constant than the layer of dielectric disposed between the conductive layers of the same strata. The alteration of the capacity between turns, as will be seen, may be insured by making the relation between dielectric constant and thickness of the dielectric layer for the dielectric between the conductive layers of the same layers different, let us say, greater than the relation between dielectric constant and thickness of the dielectric layer provided between the constituent layers.

If there is an A. C. source for the apparatus of the electric machine in whose line connecting wires there is provided circuit means according to the present disclosure, then the inductance in the line will not become operative when the working current flows therethrough. The working A. C., as will be seen, is of different direction in the different wires in each unit of time so that the induction fields set up by working currents of opposite direction will neutralize each other, while for the stray waves being approximately co-phasic the inductance will become fully operative.

For the suppression of disturbing high frequency energy recourse may also be had to arrangements of the kind shown in Fig. 4. The capacity in this instance consists often of a double condenser the joint coat of which is united with the grounded apparatus casing, while the separate coats thereof are united each with an inductance. If the circuit means here disclosed is so constructed that three separate layers separated from one another by dielectric are wrapped on top of one another, then the circuit means may be employed also in a way as shown in Fig. 4. The approximate equivalent or substitution key diagram of such circuit means is then identical with the one shown in Fig. 4. if in connecting the same the second conductive layer is united with the grounded casing of the apparatus, and if the first and the third coats are associated with the network connecting line.

In case the inductance obtainable by the mere wrapping over one another of the conductive layers is inadequate for the purpose desired, then an increase in inductance in the disclosure of the present invention is very easily attainable by interposing between pairs of conductive layers a layer consisting of highly magnetic material such as iron. A further increase in inductance may also be secured by laminating a layer of high permeability material, for example a layer of iron. In order that the constituent laminations may not be shorted in connecting such a laminated layer with the casing of an apparatus they are preferably inter-connected by way of capacities.

The grounding of the casing of the apparatus as hereinbefore referred to is not always advisable or possible since, for instance, in the case of transportable equipment it would be necessary to take along everywhere a ground lead in addition to the line connection wires. However, grounding of the casing is necessary inasmuch as the capacities required for draining or suppressing the disturbing frequencies, in the case of A. C. outfits, carry off also a slight part of the low frequency currents so that a person coming in touch with the housing of the apparatus, if the same were not earthed, would inadvertently become a "grounder" for such low frequency currents. However, in arrangements of the kind disclosed by the invention where three conductive layers are superposed, if the second conductive layer is connected with the casing of the apparatus, no grounding of the apparatus will be required. The capacities arising between the first and the second, and between the second and third conductive layers, as will be seen, become connected in series with the inductance of the second conductive layer thus resulting in a resonant circuit, and the latter by suitably choosing the inductance and/or the capacitance may be so designed that its natural wave comes to lie inside the range of the frequencies to be suppressed. In such a resonant circuit comprising capacity and inductance, as is well known, the impedance turns out to be the lowest for the frequency which falls inside the range of natural frequency of the resonant circuit. The passing of other frequencies, say, the supply line frequency to the casing of the apparatus is impossible if the dimensions for this resonant circuit are suitably chosen, and grounding of the casing to drain these frequencies to earth is unnecessary.

Fig. 5 shows the arrangement of a circuit means designed in accordance with what precedes and connected up with an apparatus causing disturbing waves. In this figure $a1$ denotes the casing, $b1$ and $c1$ the terminals of the apparatus causative of high frequency disturbances. The circuit means according to the invention is so connected that $d1$—$d2$ denote the first conductive layer, $e1$—$e2$ the third conductive layer, and $f$ the middle conductive layer consisting of iron. $L11$ and $L12$ then denote the inductances created by the superposition of the first and the third conductive layers, while $C22$ and $C23$ the inter-turn capacitances of the first and the third conductive layers which conjointly with the inductances $L11$ and $L12$ each result in resonance circuits $R7$ and $R8$, respectively. $C24$ and $C25$ are the capacities arising between the first and the second, and between the second and the third conductive coats, which together with the inductance $L13$ of the conducting coat $f$ result in a resonant circuit $R9$. By this resonance circuit tuned to high frequency there are created two high frequency short circuit paths, one of which runs from casing $a1$ by way of terminal $b1$, the capacity $C24$, inductance $L13$ and back to the casing $a1$, while the other one goes from casing $a1$ by way of terminal $c1$, capacity $C25$, inductance $L13$ back to the casing $a1$. The resonant circuits $R8$ and $R7$ block the way of high frequency stray waves flowing under approximately co-phasic conditions over both lines, while the induction fields created by the working currents, owing to the opposition in their directions, become neutralized.

In order that partial inductances and partial capacities may be obtainable for the conducting layers or coats, the latter may be provided with taps which, for instance, may be brought out laterally from the corner or wrapper.

By suitably connecting together the capacities and the inductances, and the subdivisional inductances and capacities of the circuit means of the invention, and by suitably connecting the latter in the circuit, it will be seen that also other resonant (or acceptor) circuits and effects are securable than those hereinbefore described.

For the object of obtaining other special resonant circuits it would be feasible to vary also the capacity along the wound or wrapped layers by changing the relationship between the dielectric constant and the thickness of the dielectric layer along the superposed dielectric layers. For instance, it will be seen that the thicknesses of the dielectric layers become either greater or smaller as the length thereof increases. Also the dimensions or electrical properties of the conducting layers or coats, if variation of inductance along the layers is desired, could be altered in a suitable way with increase in length.

What is claimed is:

1. Filter circuit means for the elimination of disturbing high frequency currents comprising an inductive capacitor, said inductive capacitor comprising a plurality of turns of conductive strips wound in the form of a roll, a plurality of dielectric strips forming a layer which is interposed between the conductive strips the thickness of at least one of the dielectric layers being thicker than the others and separate terminals at the beginning and end of each strip for electrically connecting the inductive capacitor in series with a supply line and apparatus causing the high frequency currents.

2. Filter circuit means for the suppressing of disturbing high frequency currents comprising an inductive capacitor, said inductive capacitor comprising a pair of conductive strips wound in the form of a roll, a pair of dielectric strips interposed between the conductive strips, the number of turns of said conductive strips and the thickness of said dielectric layers being determined by the paralleling of active inter-turn capacity and inductances so as to fall within the range of the frequency to be suppressed.

3. Filter circuit means for the suppressing of disturbing high frequency currents comprising an inductive capacitor, said inductive capacitor comprising a pair of conductive strips wound in the form of a roll, a pair of dielectric strips interposed between the conductive strips, the dimensions of the width and the number of turns of said conductive strips and the thickness of the said dielectric layers being determined by having the inductance of the conductive foil higher than the active inter-turn capacity.

4. Filter circuit means for the elemination of disturbing high frequency currents comprising a plurality of turns of conductive strips wound in the form of a roll, two dielectric layers interposed between the conductive strips, the thickness of one of the layers being greater than the other, and terminals at the beginning and end of each conductive strip for electrically connecting the strips in series with a supply line and the apparatus causing the high frequency currents.

5. Filter circuit means for the elimination of disturbing high frequency currents comprising a plurality of turns of conductive strips wound in the form of a roll, two dielectric layers interposed between the conductive strips, the dielectric constant of one of the layers being greater than the other, and terminals at the beginning and end of each conductive strip for electrically connecting the strips in series with a supply line and the apparatus causing the high frequency currents.

6. Filter circuit means for the elimination of disturbing high frequency currents comprising a pair of iron strips wound in the form of a roll, two dielectric layers interposed between the conductive strips, the thickness of one of the layers being greater than the other, and terminals at the beginning and end of each conductive strip for electrically connecting the strips in series with a supply line and the apparatus causing the high frequency currents.

7. Filter circuit means for the elimination of disturbing high frequency currents comprising a pair of laminated iron strips wound in the form of a roll, two dielectric layers interposed between the conductive strips, the thickness of one of the layers being greater than the other, and terminals at the beginning and end of each conductive strip for electrically connecting the strips in series with a supply line and the apparatus causing the high frequency currents.

8. Filter circuit means for the elimination of disturbing high frequency currents comprising a pair of taps for terminal connection and wound in the form of a roll, two dielectric layers interposed between the conductive strips, the thickness of one of the layers being greater than the other, and terminals at the beginning and end of each conductive strip for electrically connecting the strips in series with a supply line and the apparatus causing the high frequency currents.

9. Filter circuit means for the elimination of disturbing high frequency currents comprising a plurality of turns of conductive strips wound in the form of a roll, two dielectric layers interposed between the conductive strips, the thickness of the dielectric strips being so arranged that the relationship between the dielectric constant and the thickness of the dielectric layer varies with increase in length of the dielectric layers, and terminals at the beginning and end of each conductive strip for electrically connecting the strips in series with a supply line and the apparatus causing the high frequency currents.

KURT SCHUBERT.